US012370537B2

(12) United States Patent
Grischott et al.

(10) Patent No.: US 12,370,537 B2
(45) Date of Patent: Jul. 29, 2025

(54) LABORATORY STORAGE CABINET WITH A ROTARY ELEMENT IN A TRANSFER AIR LOCK

(71) Applicant: Hamilton Storage GMBH, Domat/Ems (CH)

(72) Inventors: Orlando Grischott, Scharans (CH); Martin Frey, Reichenburg (CH); Marco Hosang, Bonaduz (CH); Tobias Gafafer, Maladers (CH); Martina Cavegn, Chur (CH); Jael Graf, Flims Waldhaus (CH)

(73) Assignee: Hamilton Storage GmbH, Domat/Ems (CH)

( * ) Notice: Subject to any disclaimer, the term of this patent is extended or adjusted under 35 U.S.C. 154(b) by 543 days.

(21) Appl. No.: 17/784,091

(22) PCT Filed: Dec. 10, 2020

(86) PCT No.: PCT/EP2020/085474
§ 371 (c)(1),
(2) Date: Jun. 9, 2022

(87) PCT Pub. No.: WO2021/116269
PCT Pub. Date: Jun. 17, 2021

(65) Prior Publication Data

US 2023/0019191 A1 Jan. 19, 2023

(30) Foreign Application Priority Data

Dec. 13, 2019 (DE) ..................... 10 2019 134 394.1

(51) Int. Cl.
*B01L 1/02* (2006.01)

(52) U.S. Cl.
CPC ........... *B01L 1/02* (2013.01); *B01L 2200/025* (2013.01); *B01L 2200/085* (2013.01); *B01L 2300/1883* (2013.01); *B01L 2300/1894* (2013.01)

(58) Field of Classification Search
CPC ................ B01L 1/02; B01L 2200/025; B01L 2200/085; B01L 2300/1883; B01L 2300/1894
See application file for complete search history.

(56) References Cited

U.S. PATENT DOCUMENTS 6,467,285 B2 10/2002 Felder et al.
6,725,603 B1 * 4/2004 Pansini .................. E05D 15/48 49/141

(Continued)

FOREIGN PATENT DOCUMENTS

CN 102976021 A 3/2013
CN 208096469 U 11/2018

(Continued)

OTHER PUBLICATIONS

Office Action for corresponding CN 202080084931.8 mailed Oct. 16, 2023, 7 pgs.

(Continued)

*Primary Examiner* — Jill A Warden
*Assistant Examiner* — Michael Stanley Gzybowski
(74) *Attorney, Agent, or Firm* — RANKIN, HILL & CLARK LLP

(57) ABSTRACT

A laboratory storage cabinet, including a cabinet housing, which delimits a storage space inside the cabinet housing from an outer surrounding area of the storage cabinet, wherein the cabinet housing has an air lock, which allows the transport of material between an inner transfer position, situated in the storage space, and an outer transfer position, (Continued)

situated in the outer surrounding area, wherein the storage space contains a storage device for receiving material at defined storage positions, and wherein the storage space contains a material-handling device for transporting material between the inner transfer position and the storage device, wherein, in a wall of the cabinet housing, the air lock has an air-lock opening, which passes through the wall, the air lock having a rotary element, which is mounted rotatably about an axis of rotation in relation to the cabinet housing and has at least one loading formation, which is fitted in the air-lock opening in such a way that the loading formation can be moved between the inner transfer position and the outer transfer position by rotation of the rotary element about the axis of rotation.

16 Claims, 6 Drawing Sheets

(56) References Cited

U.S. PATENT DOCUMENTS

| | | | | |
|---|---|---|---|---|
| 7,861,540 | B2 | 1/2011 | Cloutier et al. | |
| 9,255,936 | B2 | 2/2016 | Hunt et al. | |
| 2002/0060219 | A1* | 5/2002 | Rypan | F24C 15/18 219/680 |
| 2008/0272674 | A1 | 11/2008 | Malin | |
| 2014/0377038 | A1 | 12/2014 | Malin | |
| 2016/0084564 | A1 | 3/2016 | Malin | |
| 2021/0039082 | A1 | 2/2021 | Schafrinski | |

FOREIGN PATENT DOCUMENTS

| | | | |
|---|---|---|---|
| CN | 209058385 | U | 7/2019 |
| CN | 209680111 | U | 11/2019 |
| DE | 29613557 | U1 | 9/1996 |
| DE | 102012207665 | B4 | 2/2017 |
| DE | 102016124722 | A1 | 6/2018 |

OTHER PUBLICATIONS

Espacenet Bibliographic data:CN209058385 (U), Published Jul. 5, 2019, 1 pg.

Espacenet Bibliographic data:CN102976021 (A), Published Mar. 20, 2013, 1 pg.

Espacenet Bibliographic data:CN209680111 (U), Published Nov. 26, 2019, 1 pg.

Espacenet Bibliographic data:CN208096469 (U), Published Nov. 16, 2018, 1 pg.

International Preliminary Report on Patentability for corresponding PCT/EP2020/085474 mailed May 17, 2022, 6 pgs.

German Search Report for corresponding DE 10 2019 134 394.1 mailed Sep. 8, 2020, 8 pgs.

International Search Report for corresponding PCT/EP2020/085474 mailed Apr. 7, 2021 13 pgs.

Sielaff GmbH & Co. KG: Technical Manual Robimat 75 / Robimat 99. Stand Oct. 29, 2015; Herrieden, 2015 (Art-No. 700 66 011 00_051), 59 pages—company publication. URL: https://eu-data.manualslib.com/pdf/de/pdf8/37/3690/368958-sielaff/robimat_99.pdf?ab19fbbd5696121340e491c2bb979d01&tak e=binary [retrieved Sep. 7, 2020].

Espacenet Bibliographic data:DE 102012207665 (B4), Published Feb. 9, 2017, 1 pg.

Espacenet Bibliographic data:DE102016124722 (A1), Published Jun. 21, 2018, 1 pg.

* cited by examiner

LABORATORY STORAGE CABINET WITH A ROTARY ELEMENT IN A TRANSFER AIR LOCK

This application claims priority in PCT application PCT/EP2020/085474 filed on Dec. 10, 2020, which claims priority in German Patent Application DE 10 2019 134 394.1 filed on Dec. 13, 2019, which are incorporated by reference herein.

The present invention concerns a laboratory storage cabinet, comprising a cabinet housing which demarcates a storage space inside the cabinet housing from an external environment of the storage cabinet, where the cabinet housing comprises a transfer air lock, referred to hereunder in brief only as “air lock”, which allows material transport between an inner transfer position located in the storage space and an outer transfer position located in the external environment, where in the storage space there is present a storage device for accommodating material at defined storage positions, and where in the storage space there is present a manipulation device for material transport between the inner transfer position and the storage device, where the air lock exhibits in a wall of the cabinet housing an air lock aperture which penetrates through the wall.

BACKGROUND OF THE INVENTION

Such a laboratory storage cabinet, which for the sake of simplicity is also referred to hereunder in brief just as “storage cabinet”, is known from DE 296 13 557 U1. A further relevant storage cabinet is known from US 2016/0084564 A1. For further information on the state of the art relating to laboratory storage cabinets, please refer to WO 2012/034037 A2.

Such laboratory storage cabinets usually serve—in the state of the art just as in the present invention—for keeping chemical and/or biological and/or biochemical substances under predetermined storage conditions. The substances to be kept are normally stored accommodated in a container, such that normally one or several containers with a substance accommodated therein is or are designated by the “material” designation generally used in the present application.

The predetermined storage conditions can refer to an atmosphere in the storage space which is predetermined with regard to temperature and/or humidity and/or pressure and/or chemical composition and/or further parameters. For this reason, the demarcation of the storage space from the external environment of the storage cabinet by the cabinet housing is of significance, since in the external environment there usually prevails an atmosphere which at least with regard to one parameter differs from the predetermined storage conditions in the storage space.

In order to be able to bring material into the storage cabinet for storage and remove it from same for further laboratory processing without excessively disturbing the storage environment in the storage space which differs from the external environment, the known storage cabinets comprise air locks via which material can be brought from the external environment through the cabinet housing into the storage space and likewise transferred from the storage space through the cabinet housing into the external environment.

The air locks of the aforementioned known laboratory storage cabinets comprise, as a transport medium for transporting material between the inner transfer position located in the storage space and normally reachable only from the storage space and the outer transfer position located in the external environment and normally reachable only from the external environment, a slide movable in a translational manner which is displaceable back and forth through the air lock aperture between the outer transfer position in the external environment and the inner transfer position in the storage space.

Inside the storage cabinet, i.e. in the storage space, the manipulation device takes over automatically the further material transport between the inner transfer position and a storage position in the storage device, such that material introduced via the air lock into the storage space can be stored in a locatable manner.

The advantage of a slide movable in a translational manner in the transfer air lock of the storage cabinet lies in the fact that for this slide there can be provided a relatively small transitional volume which is delimitable both against the storage space and against the external environment, in which the slide beginning at its start transfer position can first be moved inward. After matching the atmospheric conditions in the transitional volume to the atmospheric conditions of the target transfer position, the slide then can be further moved from the transitional volume to the target transfer position without appreciably disturbing the atmospheric conditions at the target transfer position. Whereas maintaining the atmospheric conditions at the outer transfer position is normally non-critical, since the external environment can be regarded without error as approximately infinite in comparison with the storage space, the effect of material transport from outside into the storage space on the atmospheric conditions in the storage space is considerably greater.

The drawback of the known slides of transfer air locks which are movable in a translational manner is their low material throughput per unit of time. One attempts to offset this drawback of the low material throughput by way of a correspondingly large number of parallel usable air locks or by way of a structurally relatively large air lock, through which an especially large quantity of material can be transported in a single transfer.

Nevertheless, both the use of several parallel usable air locks and the use of a spatially large air lock require appropriate installation space at the laboratory storage cabinet. It is precisely in smaller storage cabinets of the size of a domestic refrigerator, even a large domestic refrigerator, that the installation space needed for several air locks or for a large air lock is not available in order to achieve in a known way material transfer between the inner and outer transfer positions with the highest possible material throughput per unit of time.

SUMMARY OF THE INVENTION

It is, therefore, the task of the present invention to develop a laboratory storage cabinet as mentioned at the beginning in such a way that it can be operated even in the case of a small available installation space with high material throughput and without excessive impairment of the storage conditions in the storage space.

The present invention solves this task in a laboratory storage cabinet as mentioned at the beginning of the present application by having the air lock comprise a rotating body with at least one loading formation, the former mounted rotatably about an axis of rotation relative to the cabinet housing. The rotating body is installed in the air lock aperture in such a way that the loading formation is displaceable between the inner and the outer transfer positions through rotation of the rotating body about the axis of rotation.

The fundamental use of a rotating body allows rapid transport of material, namely in particular of containers, between the inner and the outer transfer positions in a very small installation space. Since the loading formation of the rotating body is moved through rotation about the axis of rotation of the rotating body between the inner and the outer transfer positions, the installation space taken up by the rotating body as the means of transport in the narrower sense also corresponds essentially to its movement space. Thus the rotating body can not only provide a receptive loading formation in the inner and/or the outer transfer position, but while providing it can also close the air lock aperture with an element section such that the rotating body can be not only a means of transport for material stored or to be stored but also a means of closing the air lock aperture. Hereby the operation of the transfer air lock can also be considerably simplified, since one and the same component, namely the rotating body, can effectuate both material transport between the inner and the outer transfer positions and a closure situation of the air lock aperture. Such a closure situation comprises a complete or the most far-reaching possible closure of the air lock aperture. The air lock can therefore be free from swiveling and/or sliding means of closure such as doors, shutters, and partitions.

For the sake of clarity let it be noted that the aforementioned transfer positions: inner and outer transfer position, are merely locations of transient material accommodation during material transport from the external environment into the storage device, whereas the storage positions in the storage device are locations of long-term material accommodation at which the material remains until retrieval from storage, at any rate remains for considerably longer than at the transfer positions at which the material is merely provided for transport between the transfer positions and/or for takeover by a person or a manipulation device in the external environment or by the manipulation device in the storage space.

In principle, the rotating body can exhibit just a single loading formation, which in the event of a transport requirement is moved into the respective transfer position for taking on material by the manipulation device in the storage space or by operating personnel or a manipulation device in the external environment. The maximum material throughput achievable with the storage cabinet discussed here can, however, be increased in a simple manner by the rotating body exhibiting at least two loading formations, of which a first loading formation is situated in one transfer position out of outer and inner transfer positions when a second loading formation different from the first is situated in the respective other transfer position out of outer and inner transfer positions. Thus even when in the one transfer position material is being removed from the first loading formation or is being loaded onto it, in the respective other transfer position the second loading formation stands by in order to likewise take on or release material. Furthermore, under a purely functional consideration of the movement of a loading formation from one transfer position into the other transfer position and from the other transfer position into the first transfer position, only half the route needs to be traversed compared with the case where only a single loading formation is provided at the rotating body. This leads to advantageously short loading cycles of 5 to 7 seconds, i.e. every 5 to 7 seconds an item and/or material can be fed into the storage cabinet i.e. placed in storage, and withdrawn from the storage cabinet, i.e. removed from storage, since simultaneously one loading formation each stands by at the inner and at the outer transfer position. Unlike the known transfer slides which are movable in a translational manner, this allows parallelization of procedures placing in storage and removing from storage.

In principle, more than two loading formations can be configured at the rotating body. To make sure that when in each transfer position there is situated one loading formation, the rotating body can close the air lock aperture by an element section, the rotating body preferably exhibits exactly two circumferential sectors with at least one loading formation each, which are arranged rotated by 180° relative to one another in respect of the axis of rotation. Preferably, the inner and the outer transfer positions lie at an angular separation of 180° from one another about the axis of rotation.

To facilitate the manipulation of the transfer air lock, the rotating body is preferably symmetrical relative to the axis of rotation in such a way that a large part of that shape of said rotating body which is discernible from outside the rotating body is invariant under rotation by 180° about the axis of rotation. This means: If, starting from an arrangement of a loading formation in a transfer position, the rotating body rotates by 180°, then once again a loading formation is situated in the same transfer position and the rotating body presents to the observer looking at the transfer position essentially the same view as before the rotation by 180°. Preferably, this type of symmetry about the axis of rotation applies to each rotational position of the rotating body and a rotation by 180° performed starting from this rotational position.

In order to be able to guarantee closure of the air lock aperture in at least one rotational position, preferably the first loading formation is physically separated from the second loading formation by a partition of the rotating body. The partition is part of the rotating body, and on the rotational movement of the latter likewise rotates about the axis of rotation.

Preferably, element sections of the rotating body which bound the accommodating space at a loading formation laterally and/or upwards and/or downwards, are configured as hollow or porous in order to reduce the mass moment of inertia of the rotating body. A porous material for forming porous element sections of the rotating body can be a porous fiber material and/or an open-cell or closed-cell foam material.

In order to be able not only to effect physical closure by the rotating body of the air lock aperture and thus prevent undesirable gas flow between the storage space and the external environment, but over and above that also to be able to achieve thermal insulation of the storage space against the external environment in the air lock region, according to a preferable development of the storage cabinet there can be arranged in the region of the partition a partition material configured separately from the rest of the rotating body having a lower specific thermal conductivity and/or having a lower heat transfer coefficient than a material used predominantly to form the rest of the rotating body. This thermally insulating partition material can be built in integrally as a material section within the rotating body or as a prefabricated plate or generally a component in the rotating body. The "predominant" use refers to the spatial volume taken up by element sections of the rotating body out of the respective material. That material of which element sections of the rotating body are formed which take up more than 50% of the total volume of the rotating body, is inevitably the material used predominantly to form the rest of the rotating body. If there exist different element sections of the rotating body made of different materials, of which no element section of one material takes up more than 50% of the total volume of the rotating body, then the material of that element section with the greatest fraction of the total volume of the rotating body is deemed to be used predominantly to form the rest of the rotating body. Since the rest of the rotating body is used for the comparison with the partition, the partition is not part of the rest of the rotating body.

In principle, it can suffice if in the aforementioned closure situation the rotating body abuts with a narrow gap against a rim surrounding the air lock aperture of the cabinet housing wall penetrated through by the air lock aperture. The rotating body can be configured in such a way that a large part of its outer surface—for instance, its front faces each of which points along the axis of rotation and at least one section proceeding in the circumferential direction of a lateral face, the latter possibly interrupted by at least one recess in which a loading formation is arranged and a hollow space is configured in the loading formation for accommodating material to be transported—is arranged with a predetermined gap dimension with respect to the rim of the air lock aperture, in particular a constant one along the air lock aperture rim. Whereas according to a preferable embodiment, the lateral face is interrupted by one or several recesses—normally depending on the number of loading formations, where preferably for each loading formation there is provided its own recess—the front faces of the rotating body can, independently of the rotational position of the rotating body, lie opposite the rim of the air lock aperture in the cabinet housing wall with a predetermined gap dimension, in particular a constant one along the air lock aperture rim.

In a standby state of the rotating body, in which the rotating body is stationary and at least one loading formation is situated in a transfer position, an element section of the rotating body can, encircling along the rim of the air lock aperture with a predetermined, in particular constant, small gap dimension of less than four, preferably less than 2 mm distance from the rim, lie opposite the latter, thus effecting a closure situation as described above.

Such gap formation with a small gap dimension of less than four, preferably less than 2 mm is realistically usable only for such storage spaces whose atmospheric conditions do not differ quantitatively too much from those of the external environment. Better separation between the storage space and the external environment than by way of the gap described above and thus a lower effect by the external environment on the conditioned atmosphere in the storage space, can be achieved by having at least one component out of the rotating body and the cabinet housing wall with air lock aperture exhibit a seal with a sealing surface, which is configured for sealing abutment against the respective other component.

Preferably the seal is arranged at the cabinet housing and/or at a frame surrounding the air lock aperture, since the air lock aperture is to be sealed by the seal. In principle, it is conceivable that during a rotational movement of the rotating body, the sealing surface is in frictional contact with the respective other component, preferably with the rotating body. Such frictional contact, however, can stress the sealing surface mechanically and lead to undesirably high wear and consequently to an undesirably short lifetime of the sealing surface. In order to prevent this sealing surface wear, according to an advantageous development of the present invention it is provided that the laboratory storage cabinet exhibits a sealing surface clamping device, by means of which the sealing surface of a seal of at least one component is clampable against the respective other component and unclampable in the opposite direction.

This clamping against the respective other component can mean merely an increase or decrease of the abutment force of the sealing surface against the other component, without the sealing surface which in any case abuts permanently against the respective other component being actually withdrawn away from same. This too serves to decrease the wear. A more far-reaching wear prevention can be achieved by the sealing surface being movable by the sealing surface clamping device towards the respective other component and away from it. Then it can actually be achieved that the seal and its sealing surface are arranged in the unclamped state at a distance from the respective other component, preferably from the rotating body, such that in the unclamped state the sealing surface does not touch the respective other component. A movement of the respective other component relative to the sealing surface cannot then give rise to an abrasive effect at the sealing surface.

In principle, one sealing surface clamping device each could be provided both at the rotating body and in the rim region of the air lock aperture, i.e. at a section of the cabinet housing wall surrounding the air lock aperture or at a frame surrounding the air lock aperture, in order to clamp an/or displace a sealing surface towards the respective other component and away from it, such that in a closure situation with a gap-free physically sealed air lock aperture the sealing surfaces of a cabinet housing- or frame-side seal and of a rotating body-side seal abut against each other in the closure situation. This, however, requires very precise positioning of the rotating body relative to the cabinet wall in order to provide secure abutment contact between the two sealing surfaces which are movable relative to one another. A more robust and at the same time very effective gap-free sealing of the air lock aperture in the closure situation can be achieved by only the sealing surface of the seal of one component out of the rotating body and cabinet housing wall with air lock aperture, preferably the cabinet housing wall and/or a frame surrounding the air lock aperture, being clampable by a sealing surface clamping device towards the respective other component and unclampable in the opposite direction. In the simple case, an element section of the respective other component can serve as the abutment surface for the sealing surface of the seal stressable by the sealing surface clamping device. In a configuration preferable because of its higher sealing effect, the respective other component can exhibit a seal with a sealing counterface against which the sealing surface of the first component is in sealing abutment engagement in the closure situation. The sealing effect towards the gap-free sealing of the air lock aperture can be further increased by the sealing counterface-exhibiting seal of the other component being deformable in the abutment engagement by the sealing surface of the clampable and unclampable seal of the first component. Thus the sealing surface can in the abutment engagement, under clamping of the seal carrying it, push into the sealing counterface of the seal lying opposite to it, thus producing not only a relatively large abutment region between the sealing surface and the sealing counterface, but also produce a curved, two-dimensional abutment region which separates the external environment and the storage space especially effectively from each other.

Preferably the rotating body exhibits the seal with the sealing counterface which is deformable by the sealing surface. Since preferably the sealing counterface is situated in a region of the rotating body which in the aforementioned standby state of the rotating body lies opposite a rim of the air lock aperture and is reachable by a seal which is provided in the rim region of the air lock aperture and is deformable by the sealing surface clamping device, preferably at least one section of the seal deformable by the sealing surface clamping device surrounds the aforementioned partition and/or the thermally insulating partition material radially outside.

The seal in the rotating body which is deformable by the sealing surface can additionally serve as tolerance compensation, for instance if the rotating body is formed of at least two element halves whose separation or joint plane contains the axis of rotation of the rotating body. In this case, the deformable seal can advantageously be arranged between the two element halves, and because of its intrinsic deformability permit the two element halves to approach one another under deformation of the seal arranged between them. Thus a gap between the element halves of the rotating body can be closed and at the same time the gap dimension between element halves be adjusted exactly.

Preferably the axis of rotation penetrates through the aforementioned, preferably thermally insulating, partition. Especially preferably, the partition contains a diametral plane which penetrates through the rotating body along a diametral ray orthogonal to the axis of rotation. Additionally or alternatively, a plane containing the axis of rotation of the rotating body intersects the seal which is deformable by the sealing surface in the rotating body. The seal in the rotating body can then border the partition and/or the thermally insulating partition material at least section-wise, for instance with the exception of the location of the pivot bearing of the rotating body.

The sealing surface clamping device can be variously configured. According to a first embodiment, the sealing surface clamping device can be configured to introduce gas into a seal interior space of a hollow sealing component. For example, the hollow seal component can be a hose seal which is inflated by the sealing surface clamping device by means of pressure-increasing gas introduction against its material and/or component elasticity and thus is dilated and is shrunk again due to its own elasticity by means of pressure-decreasing gas drainage. A sealing surface can thereby, in a surface region of the hose seal, be made to approach an opposite abutment surface at the respective other component, be pressed against it, and be removed from it again.

Additionally or alternatively, the sealing surface clamping device can comprise a pinching device, which by pinching a seal component in a pinching direction under utilization of a transverse expansion of the seal component, effect an expansion of the material in an expansion direction different from, preferably orthogonal to, the pinching direction. Therefore the sealing surface clamping device as a pinching device can be configured to deform the seal in a first direction, namely the pinching direction, in order thereby to displace the sealing surface in a second direction, namely the expansion direction, different from the first one. Preferably the pinchable seal proceeds around at least 80%, preferably around 100% of the air lock aperture. The pinching direction preferably proceeds in the axial direction with respect to a virtual aperture axis which penetrates centrally through the air lock aperture, such that a sealing surface pointing radially inward towards the air lock aperture is displaced radially inward along an expansion direction proceeding radially with respect to the virtual aperture axis. The elasticity of the seal effects its resetting in the direction of its original shape after an end of the pinch-stressing. The pinchable seal too can be a hose seal, which however in contrast to the fluidically dilatable hose seal does not have to be fluid-tight.

Constructionally, the sealing surface clamping device can be realized effectively and at low assembly cost by the cabinet exhibiting a frame which surrounds the air lock aperture and the rotating body, where the frame as a pinching device exhibits two frame components which between them define a gap in which the seal is accommodated. The sealing surface of the seal points radially inward towards the middle of the air lock aperture and/or towards the rotating body, respectively. The frame components can be moved nearer to one another for deforming the seal lying between them and further away from one another. Preferably, each frame component taken on its own surrounds the air lock aperture, such that a seal which advantageously encircles the air lock aperture completely is also pinchable along its entire encircling path. For a defined application of pinching stress, preferably a pinch drive is further provided through which at least one frame component can be moved nearer to the respective other frame component under a decrease in the gap dimension between the frame components. In principle, both frame components can be arranged at the cabinet housing movably relative to one another. More simply and with a lower assembly cost in the production, however, preferably a frame component is configured for permanent fixing at the cabinet housing or is permanently fixed at the cabinet housing, such that only the further frame component is displaceable by the pinch drive relative to the frame component fixed at the housing.

The pinch drive can be a fluid-actuated drive or an electric motor drive. According to an embodiment which is preferable because of its low tilting tendency, a frame component is connected with the other frame component via at least two, preferably more than two, especially preferably four, spindle drives movably along the spindle axes relative to the respective other frame component. The at least two spindle drives can be drivable via a rope or belt drive synchronously for rotation by one and the same pinch drive, such that secure, tilt-free relative movability of the one frame component relative to the other can be achieved. When the frame components exhibit corner regions, for instance at the meeting point of two pair-wise parallel lateral margins, preferably in each corner region at which two non-parallel lateral margins meet there is arranged one spindle drive. The frame component defined as the frame component fixed at the housing can be formed by a wall of the cabinet housing.

In principle it is conceivable that for displacing the at least one loading formation, the rotating body is manually movable between the inner and the outer transfer positions, for instance through an actuator such as a crank arm or a drive wheel, and a drive shaft and/or drive gear. For the most hygienic procedure possible, especially preferably automated procedure, of storage of material in the storage cabinet and/or removal of material from the storage cabinet, the storage cabinet preferably exhibits a rotary drive for rotating the rotating body. Preferably the rotary drive is an electric motor rotary drive, such that its rotation can be transmitted as directly as possible by the aforementioned rope or belt drive to the aforementioned spindle drives.

For further automation of the procedures at the laboratory storage cabinet, the laboratory storage cabinet can exhibit a control device which is configured at least for controlling the rotary drive and for controlling the sealing surface clamping device. In order to prevent wear at the at least one seal involved in sealing the air lock aperture when the rotating body is stationary, the control device is preferably configured to unclamp a clamped sealing surface before operation of the rotary drive and/or to clamp an unclamped sealing surface after operation of the rotary drive. Hereby it can be made sure that a rotation of the rotating body takes place without sliding abutment of a sealing surface against it. Likewise, it can be made sure hereby that when the rotating body is stationary, for instance in the aforementioned standby state, a gap between the cabinet housing and/or the frame respectively and the rotating body is closed by the seal which is clampable and unclampable by means of the sealing surface clamping device.

The laboratory storage cabinet can further comprise at least one transfer sensor which is configured to detect a change in the loading situation of the loading formation in the outer transfer position. The transfer sensor, for example an optical sensor such as for instance a light barrier or a capacitive or inductive proximity sensor, is preferably coupled with the aforementioned control device for signal transmission, such that the control device can initiate material transport from the outer into the inner transfer position without additional operator input once the transfer sensor has detected a change in the loading situation of the loading formation in the outer transfer position. Additionally or preferably alternatively, the storage cabinet can comprise at least one engagement sensor, for example an optical sensor such as e.g. a light barrier or a capacitive or inductive proximity sensor, which is configured to detect an object which protrudes from outside the rotating body into its movement space, represented for example by its envelope. This is intended to prevent that through rotation of the rotating body, an item or even a body part of an operator protruding through its envelope is damaged and/or injured respectively. An envelope is understood here to be a virtual boundary surface of the rotating body which envelopes the turning rotating body and is rotation-symmetrical with respect to the axis of rotation.

In order to facilitate the manufacturing of the laboratory storage cabinet, the laboratory storage cabinet can exhibit a preassembled air lock assembly, comprising at least the rotating body and the frame surrounding the rotating body and the air lock aperture. Thus a laboratory storage cabinet, which to begin with disadvantageously exhibits only one door which has to be opened by an operator in order to deposit material in the storage device or remove material from the storage device, can be upgraded with the air lock assembly.

A further simplification of the assembly and in particular the upgrading of an existing storage cabinet, results from the preassembled assembly exhibiting the pinch drive and/or the rotary drive. Furthermore, the assembly can exhibit the control device which is configured to control the pinch drive and/or the rotary drive.

The preassembled air lock assembly is thereby so advantageous that the present invention also concerns an air lock assembly, comprising at least one frame surrounding an air lock aperture and a rotating body inserted in the air lock aperture and mounted at the frame rotatably about an axis of rotation in such a way that the frame surrounds the rotating body. The frame preferably exhibits as a sealing surface clamping device, in an especially preferable shape of a pinching device, two frame components which between them define a gap in which a seal is accommodated whose sealing surface is displaceable in an expansion direction orthogonal to the gap spacing by means of pinching in a pinching direction along the gap spacing. The frame components can be moved nearer to one another and further away from one another for pinching deformation of the seal lying between them. Preferably, each frame component taken on its own surrounds the air lock aperture, such that an advantageously completely encircling seal is also pinchable along its entire encircling path. For a defined application of pinching stress, preferably a pinch drive is further provided at the frame.

The developments described above of the rotating body and/or of the rim region of the storage cabinet surrounding the air lock aperture are also developments of the preassembled air lock assembly including the frame.

According to a less preferable embodiment, the air lock assembly can exhibit instead of a pinching device, preferably at the frame, a seal dilatable with a fluid against its material and component elasticity with a corresponding fluid-conveying pump as a sealing surface clamping device.

The aforementioned material to be transported can be bulk chemical, biological, or biochemical substances, such as e.g. liquids, including cell suspensions, or powder. Such substances are provided accommodated in laboratory containers, such as e.g. in microwell plates or vials. The storage device can be a shelving system, wherein laboratory containers, where applicable consolidated into bundles which contain a plurality of laboratory containers each, can be arranged and kept in rows and columns next to and under and/or above each other respectively in a space-saving manner. The laboratory storage cabinet preferably comprises an air-conditioning device in order to be able to provide a gaseous atmosphere in the storage space at least with regard to temperature and/or pressure and/or humidity and/or gas composition. The storage cabinet is preferably operated at a storage space temperature of between +20° C. and −20° C.

A laboratory storage cabinet in terms of the present invention can also comprise a pipetting robot as a manipulation device or a part thereof, working in a storage space atmosphere which differs from the atmosphere of the external environment in at least one parameter. Storage positions can then in turn be defined by a shelving system or by defined placement positions for the laboratory vessels in the working region of the pipetting robot.

In principle, the handling device has to be designed to operate under the atmospheric conditions in the storage space, i.e. for example has to be able to work accurately even in a temperature range of the storage space which differs considerably from the temperatures of the external environment.

In the simplest case, a loading formation can be a defined placing area arranged or configured at the rotating body. It can, however, also comprise a holder for vessels, for instance a bracket. For systematic orientation of material placed on a loading formation, the loading formation can exhibit positive-fit elements which interact with the material, in particular with containers, which permit the loading of a loading formation with an item only in a predetermined defined orientation. This considerably facilitates the automated manipulation of the material in the storage space.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which forms a part hereof and wherein.

DESCRIPTION OF PREFERRED EMBODIMENTS

Figure 1:
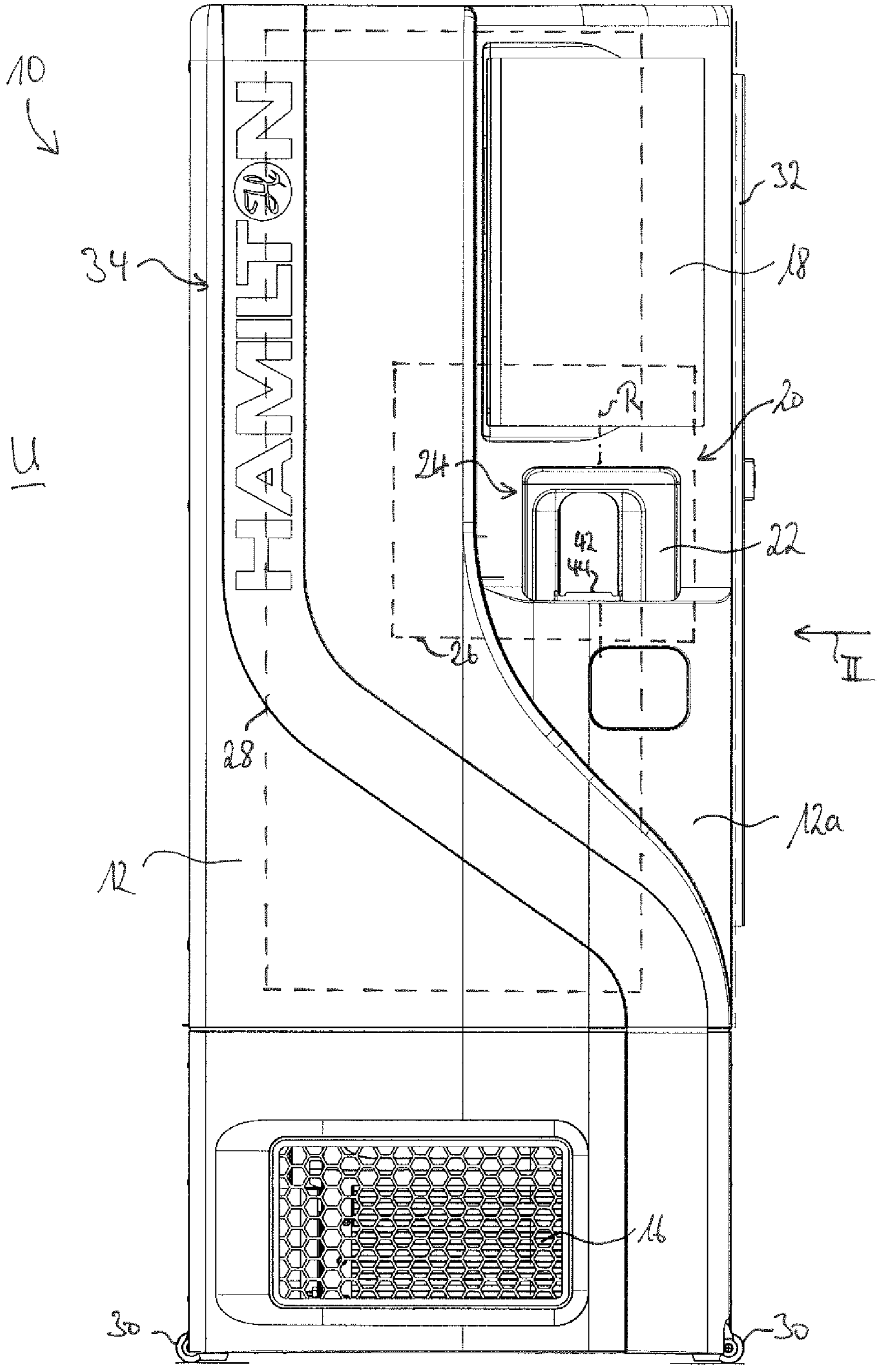
FIG. 1A front view of a laboratory storage cabinet according to the invention, FIG. 2A side view of the laboratory storage cabinet of FIG. 1, FIG. 3A perspective view of an air lock assembly of the storage cabinet of FIG. 1, comprising a frame having two frame components which surrounds an air lock aperture and a seal arranged between these, a rotating body inserted in the air lock aperture rotatably about an axis of rotation, a rotary drive of the rotating body, and a pinch drive of the frame component, FIG. 4A perspective view of the air lock assembly of FIG. 3 cut along a sectional plane containing the axis of rotation of the rotating body and penetrating through both loading formations, FIG. 5 The longitudinally cut air lock assembly of FIG. 4 when viewed in a direction which is orthogonal to the sectional plane, and FIG. 6A perspective view of the air lock assembly of FIGS. 3 to 5, cut along a sectional plane orthogonal to the axis of rotation of the rotating body.
Figure 2:
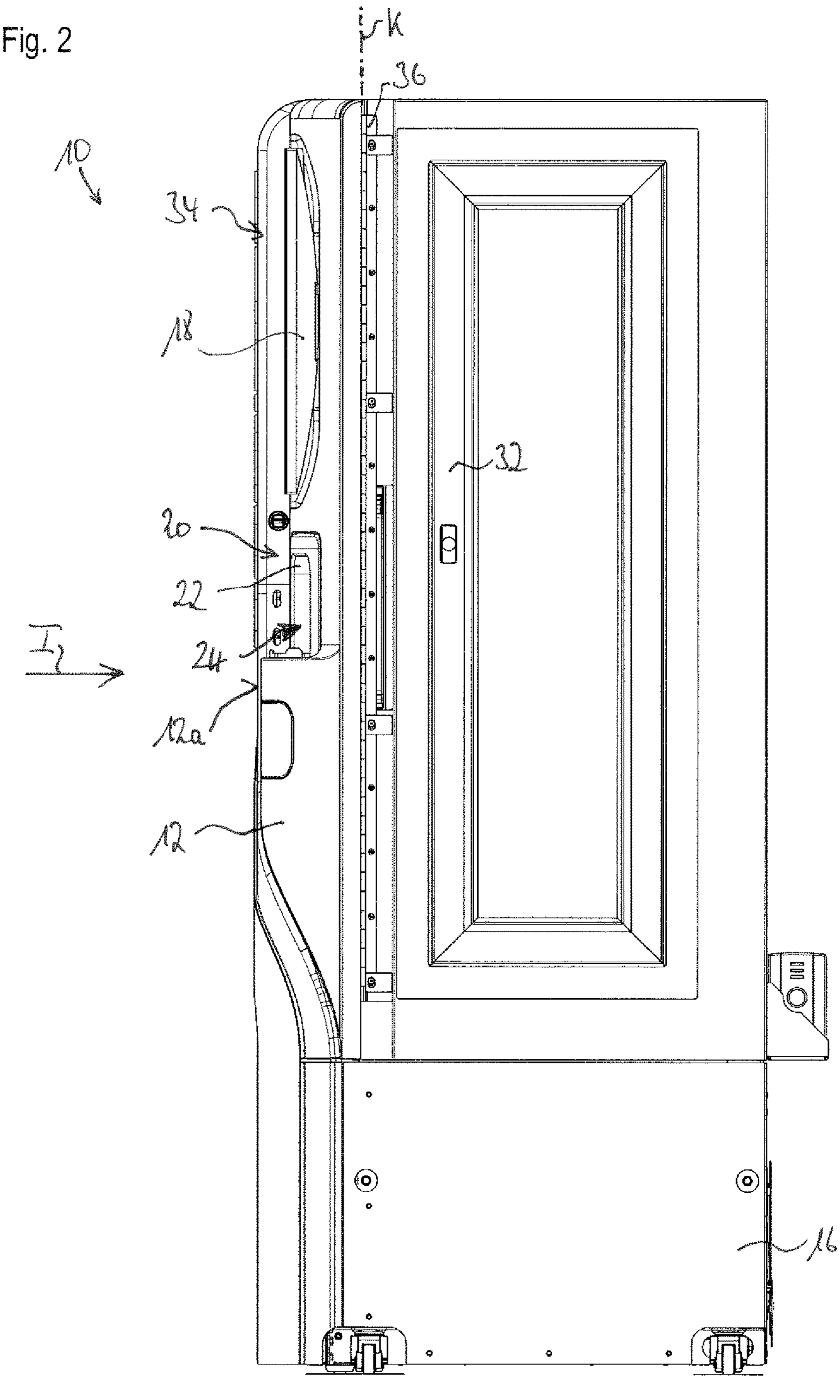

Referring now to the drawings wherein the showings are for the purpose of illustrating preferred and alternative embodiments of the invention only and not for the purpose of limiting the same, in FIGS. 1 and 2, an embodiment according to the invention of a laboratory storage cabinet is labelled generally by 10. FIG. 1 shows a front view of the storage cabinet 10 which exhibits approximately the dimensions of a large domestic refrigerator. Merely as an example, the storage cabinet can be approximately 90 cm to 100 cm wide and 220 to 240 cm tall. The dimensions of the storage cabinet, however, are not crucial here.

In FIG. 1, the viewing direction of FIG. 2 is indicated by an arrow II. In FIG. 2, the viewing direction of FIG. 1 is indicated by an arrow I.

The storage cabinet 10 exhibits a cabinet housing 12 which demarcates a storage space 14 (s. FIGS. 3 to 6) inside the cabinet housing 12 from the external environment U, such that an air-conditioning device 16 in the lower end-region of the storage cabinet 10 can maintain in the storage space 14 atmospheric conditions which differ from the conditions of the external environment. For example, the atmosphere in the storage space 14 can differ from the atmosphere of the external environment U with regard to temperature and/or pressure and/or humidity and/or chemical composition.

The storage cabinet 10 exhibits a display device 18 which as a touch-sensitive screen is also an input device, over which for example the atmospheric conditions in the storage space 14 can be adjusted. Furthermore, via the input device an item stored in the storage space 14 can be called for retrieval or a defined storage position can be assigned for an item to be accommodated in the storage space 14.

An item can overcome the cabinet housing 12—in the depicted example, its front wall 12*a*— through a transfer air lock 20 without excessively disturbing the storage conditions maintained artificially in the storage space 14 by the air-conditioning device 16.

The transfer air lock 20 comprises a rotating body 22 inserted in an air lock aperture 24 which penetrates through the cabinet housing 12, in particular through its front wall 12*a*, rotatably about an axis of rotation R proceeding in the depicted example along the direction of action of the gravitational force.

Figure 3:
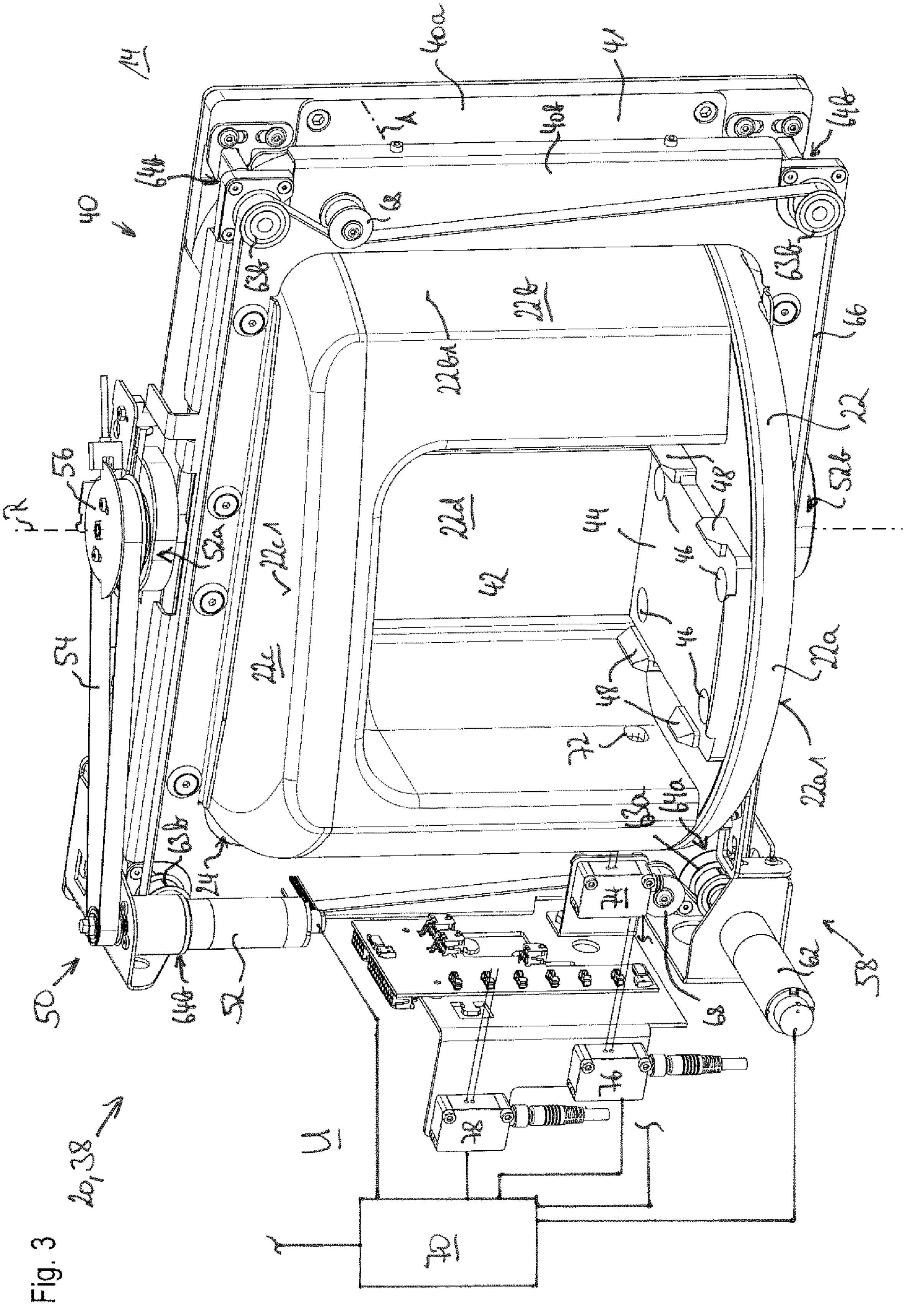

In the storage space 14, a manipulation device 26, for example a multi-axis gripper device, cooperates with the rotating body 22 in order to take over items from the latter or transfer items to it. The manipulation device 26 further cooperates with a storage device 28 which exhibits a plurality of storage positions which are accessible to the manipulation device 26, such that items are transportable by means of the manipulation device 26 between the rotating body 22 and individual storage positions of the storage device 28. To this end the storage device 28 can in principle be moveable relative to the storage housing 12, for example as a storage carousel. Tighter packing of storage positions than with a storage carousel can be obtained through a fixed arrangement of storage positions. In the present example, in which the air lock 20 is arranged at the front wall 12*a* of the cabinet housing 12, the manipulation device 26 has sufficient movement space in order to reach, starting from the inner transfer position at the air lock 20, a large number of storage positions when these are arranged at the inside of the back wall of the cabinet housing 12 which lies opposite the front wall 12*a*. In FIGS. 2 and 3, the manipulation device 26 and the storage device 28 are indicated merely roughly in a schematic manner by rectangles shown in dashed lines. The manipulation of items, such as for instance laboratory containers, in storage spaces of laboratory storage cabinets is known per se. Advantageously, individual items and/or bundles of items to be stored exhibit an identification, for instance an RFID chip or an optical code, such as e.g. a QR code or barcode. Likewise, individual storage positions can exhibit an individual identification, likewise realized by way of RFID chips or optical codes. The manipulation device or the storage cabinet in general then preferably comprises a reading device, which reads the identification of the item and where applicable of the assigned storage position and transmits this information to a data memory.

In the depicted example, the storage cabinet 10 exhibits at its lower end rollers 30, by means of which the storage cabinet 10 is passively mobile to a certain extent, i.e. for example can be moved by one or several operating personnel in a laboratory room without lifting the storage cabinet 10.

For servicing purposes, for cleaning, but also for emergency operation, the storage space 14 of the storage cabinet 10 is accessible through a side door 32. The door 32 is arranged pivotably at one side of the storage cabinet 10 and when opened offers extensive access into the storage space 14.

FIG. 1 is a view of a front panel 34 of the storage cabinet 10, which by means of a hinge 36 can be folded away from the housing wall 12 located behind it about a folding axis K which in the depicted example is parallel to the axis of rotation R, for example in order to be able to service the transfer air lock 20.

FIG. 3 depicts an air lock assembly 38 of the transfer air lock 20 on its own, i.e. without cabinet housing 12 and without front panel 34.

The air lock assembly 38 comprises the roughly cylindrical rotating body 22 and a frame 40 surrounding the rotating body 22. The frame 40 surrounds, together with the rotating body 22, also the air lock aperture 24.

The rotating body 22 exhibits at its lower longitudinal end a plate 22*a*, over which there is situated a cover 22*c* connected by sidewalls 22*b*.

The end face 22*c*1 of the cover 22*c* which points in the direction of the axis of rotation R of the rotating body 22 and is orthogonal to the axis of rotation R is flat in the depicted example. The same applies to the end face 22*a*1 of the plate 22*a* which points in the opposite direction. The transitions between the plate 22*a* and the sidewalls 22*b* and likewise between the sidewalls 22*b* and the cover 22*c* are rounded off in order to decrease the risk of injury at the rotating body 22 for operating personnel.

The lateral faces 22*b*1 of the sidefaces 22*b* are part-cylindrical. In recesses 42, which interrupt the lateral faces 22*b*1 in the circumferential direction, there are arranged loading formations 44, in the depicted example as a loading platform. Positive-fit devices 46 in the shape of defined recesses and further positive-fit devices 48 in the shape of defined projections ensure that an item, for example a laboratory container, can only be arranged in the loading formation 44 in a predetermined oriented position, since for the correct arrangement its mating positive-fit devices have to be in positive-fit engagement with the positive-fit devices 46 and 48.

The rotating body 22 is mounted in the frame 40 in an upper pivot bearing 52*a* and in a coaxial lower pivot bearing 52*b* rotatably about the axis of rotation R. The rotating body 22 is drivable by a rotary drive 50 for rotation about the axis of rotation R. The rotary drive 50 comprises a drive motor 52, which in the depicted example is electric, whose output rotational movement is transmitted via a belt 54 to a drive pulley 56 connected with the rotating body 22 for joint rotation. In the depicted example, the rotary drive 50 is arranged in the upper region of the frame 40. This arrangement is merely an example and could also be provided in the lower region of the frame 40. Likewise, additionally or alternatively to the belt drive there can be provided a gear drive or a connecting rod for transmitting the torque output of the drive motor 52 to the rotating body 22.

The frame 40 comprises a first frame component 40*a* and a second frame component 40*b*, which between them define a gap 41. The first frame component 40*a* is configured as a frame component 40*a* fixed to the cabinet housing for firm connection with the cabinet housing 12. The second frame component 40*b* is moveable relative to the first frame component 40*a* along a spacing axis A proceeding in the spacing direction between the first and the second frame components 40*a*, 40*b* nearer to the first frame component 40*a* and further away from it.

To effect a movement of the second frame component 40*b* towards the first frame component 40*a* and away from it, there is provided a sealing surface clamping device 58. Since in the gap 41 between the two frame components 40*a* and 40*b* there is situated a seal 60 which extends around the air lock aperture 24 at least section-wise but around the greatest part of the latter (see FIGS. 4 to 6), which through the second frame component 40*b* moving nearer to the first frame component 40*a* along the spacing axis A is pinched and as a consequence of this pinching its section facing towards the air lock aperture 24 with the sealing surface 60*a* is dilated orthogonally to the spacing axis A towards the air lock aperture 24 and consequently is displaced, the drive 62 of the sealing surface clamping device 58 is an aforementioned pinch drive 62.

The pinch drive 62 comprises a motor, once again preferably electric, which is coupled directly with a nut 63*a* of a spindle drive 64*a*. The nut 63*a* is mounted rotatably on the second frame component 40*b*. The spindle (not visible) surrounded by the nut 63*a* is connected rigidly with the first frame component 40*a*.

In order to prevent tilting of the second frame component 40*b* during its movement along the spacing axis A, the sealing surface clamping device 58 comprises further spindle drives 64*b* whose nuts 63*b*, likewise mounted rotatably on the second frame component 40*b*, are connected via a drive belt 66 with the nut 63*a* which is coupled directly with the motor 62 for joint rotation in the same direction. In this way, the torque output of the pinch drive 62 is distributed uniformly to the four corners of the second frame component 40*b*, such that the second frame component 40*b* can, essentially with parallel orientation to the first frame component 40*a*, be moved nearer to the latter and further away from it. Tensioning rollers 68 which likewise are mounted rotatably on the second frame component 40*b* maintain the tension of the belt 66.

A control device 70 is connected for signal transmission both with the drive motor 52 of the rotary drive 50 and with the pinch drive 62, such that the control device 70 can drive the rotating body 22 to rotate about the axis of rotation R and the second frame component 40*b* to move nearer to the first frame component 40*a* and further away from it. In this process, preferably the seal 60 is lifted off the rotating body 22 when the latter rotates and the seal 60 abuts on the rotating body when the latter is stationary.

The recess 42, which can exhibit an arbitrary shape appropriate for the material which is to be placed on the loading formation 44, exhibits in a lateral surface a passage aperture 72 through which an optical transfer sensor 74 shines into a region immediately above the loading formation 44. The optical transfer sensor 74 is connected for signal transmission with the control device 70, such that the control device 70 receives and can evaluate the detection signal of the transfer sensor 74.

The optical transfer sensor 74 serves to detect whether or not there is situated on the loading formation 44 an item to be transported from the external environment U into the storage space 14. The control device 70 can be configured to initiate, on the signal of the transfer sensor 74, a rotational movement of the rotating body 22.

The loading formation 44 visible in FIG. 3 is situated in the outer transfer position and therefore is accessible to operating personnel or to a manipulation device for automated loading.

The air lock assembly 38 further comprises two engagement sensors 76 and 78, which likewise are optical sensors. The engagement sensors 76 and 78, which likewise are connected with the control device 70 for signal transmission, create a light barrier at different heights in front of the recess 42, thus being able to detect whether an object, such as for instance a section of a manipulation device which loads the loading formation 44 or an arm or a hand of an operator, protrudes from the external environment U into the movement space of the rotating body 22, such that on a movement of the rotating body 22 there is risk of damage or injury to the object. The control device 70 is then configured to prevent movement of the rotating body 22 if at least one of the engagement sensors 76 and 78 detects an object protruding into the movement space of the rotating body 22.

The control device 70 can be coupled with the display and input/output device 18 for signal transmission.

Figure 4:
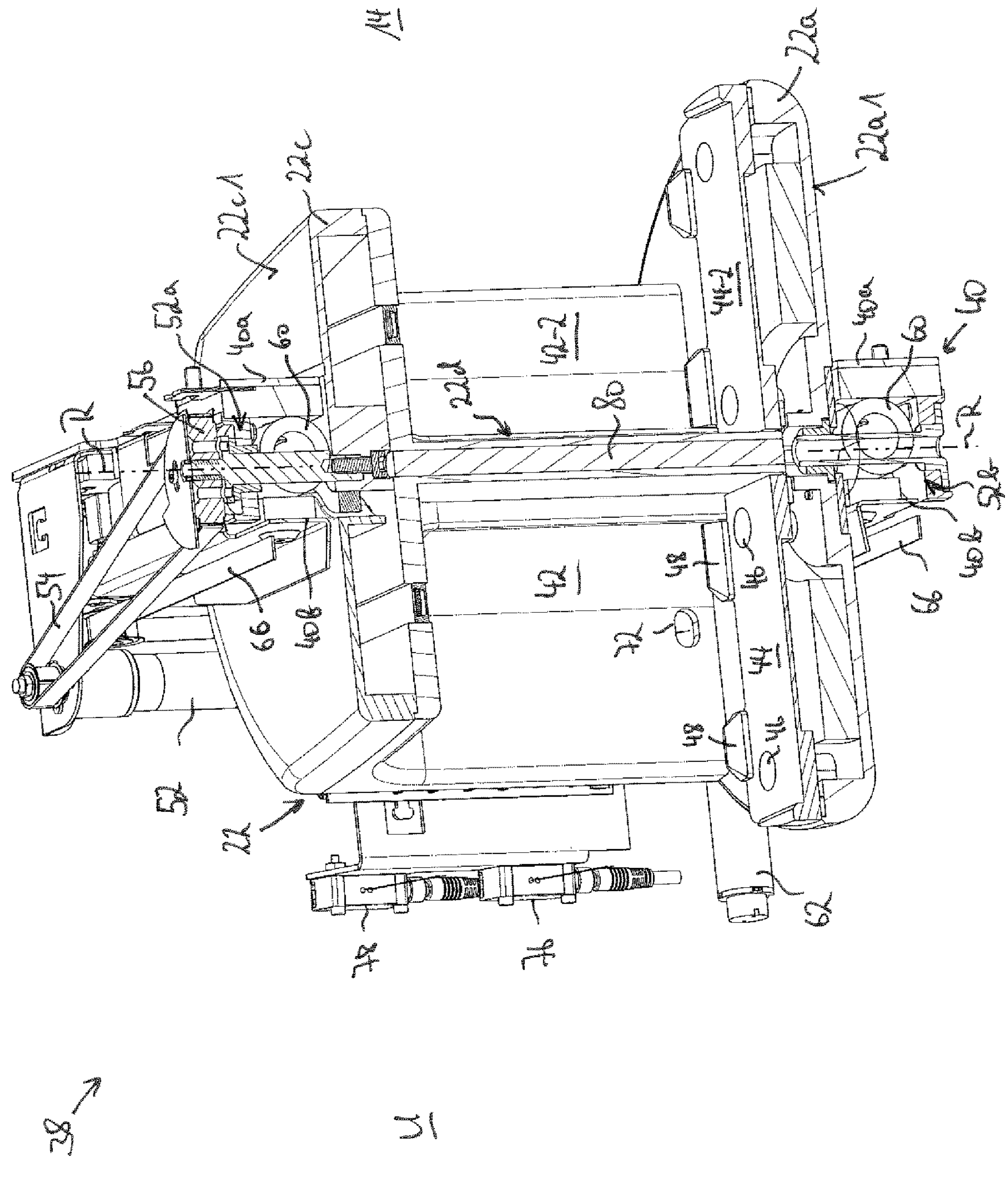
Figure 5:
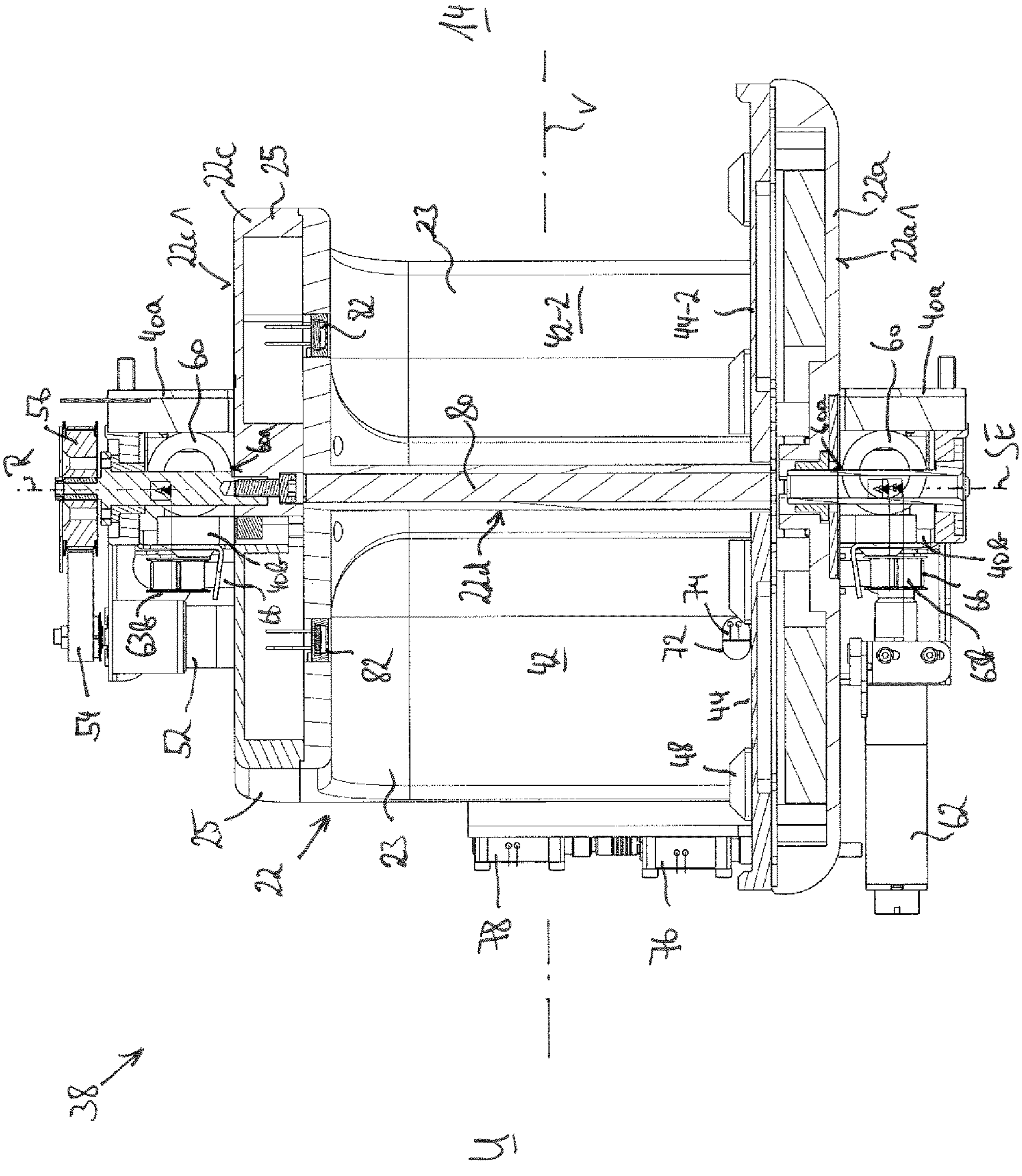

FIGS. 4 and 5 show a longitudinal section through the air lock assembly 38 along a sectional plane which contains the axis of rotation R and which penetrates essentially orthogonally through the aperture area of the air lock aperture 24.

FIGS. 4 and 5 depict a further loading formation 44-2 which lies diametrically opposite the previously described loading formation 44 and is configured and arranged mirrorimaged to the loading formation 44 described above with respect to a mirror symmetry plane SE which is orthogonal to the drawing plane of FIG. 5 and contains the axis of rotation R. Therefore, this further loading formation 44-2 will not be discussed any more below. The explanation given above concerning the loading formation 44 also applies, under the aforementioned mirror symmetry condition, to the further loading formation 44-2.

The further loading formation 44-2 is situated in a recess 42-2 which lies diametrically opposite the previously described recess 42. The recesses 42 and 42-2 are configured point-symmetrically in such a way that one recess changes over to the other recess through 180° rotation about the axis of rotation R.

The loading formation 44 and its assigned recess 42 are situated in FIGS. 4 and 5 on the side of the external environment U, such that the loading formation 44 is situated in the outer transfer position. In contrast, the further loading formation 44-2 is situated on the side of the storage space 14 and thus in the inner transfer position. The rotating body 22 is situated in its standby position.

The two recesses 42 and 42-2 are separated from one another spatially and physically by a partition **22*d*. In order to be able to maintain in the storage space 14 at the lowest possible cost an atmosphere having temperatures, normally lower ones, which differ from those of the external atmosphere of the external environment U, there is configured in the partition 22 a thermally insulating plate 80** from a suitable thermally insulating material, such as for example ceramic powder, in particular evacuated ceramic powder, a porous fiber and/or foam structure and the like.

The recesses 42 and 42-2 are each formed by part-elements 23 of the rotating body 22, which due to the point symmetry described above are preferably configured identically, such that a single tool mold suffices for their production. The plate **22*a* comprises in the depicted example only one component, which defines its outer surface. The cover 22*c* comprises two components 25** which define its outer surface, which preferably are likewise configured identically.

Between the components 25, 23 and the plate **22*a* there are configured hollow spaces, in order to either accommodate therein functional units, such as for example the lights 82 for the recesses 42 and 42-2 and their power supply cables, or in order simply to decrease the mass and thereby the mass moment of inertia of the rotating body 22**.

By means of lights 82 provided in the recesses 42 and 42-2, the loading formation associated with the respective recess can be illuminated. The lights can, for example, comprise LED lamps.

In FIGS. 4 and 5 there are in addition discernible the pivot bearings of the rotating body, which are commonplace per se.

Figure 6:
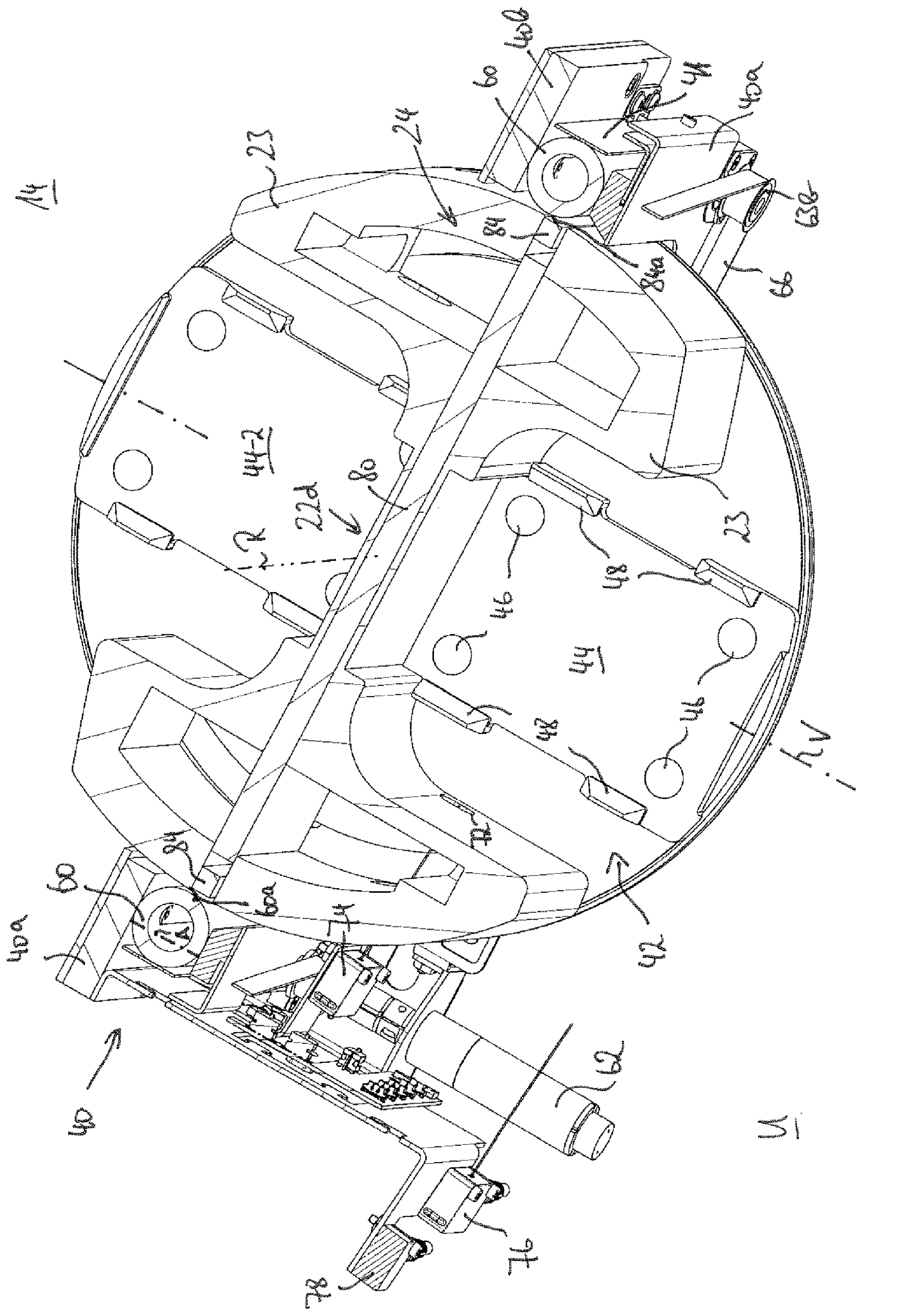

In FIG. 6, the rotating body 22 and the frame 40 are cut along a plane orthogonal to the rotation axis R. It is discernible here that the thermally insulating plate 80 as part of the partition **22*d* is surrounded by a seal 84 over a wide range of its circumference. The seal 84 exhibits a sealing counterface 84*a*, pointing towards the seal 60 which is opposite to it at the frame 40. The seal 60, depicted in the present example as a hose seal which is deformable with little force, exhibits on its side which faces towards the rotating body-side seal 84 a sealing surface 60*a*, which can be displaced by pinching the seal 60 along the spacing axis A towards the rotating body 22 and thus towards the sealing surface 84*a*. The seal 84 is made of soft elastic material, such that the seal 84 and with it the sealing counterface 84*a* are deformed and/or the sealing counterface 84*a* also displaced under the force of the sealing surface 60*a* pressing on them towards a virtual aperture axis V orthogonal to the axis of rotation R and notionally penetrating centrally through the air lock aperture 24**.

The virtual aperture axis V is parallel to the drawing plane of FIG. 5.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A laboratory storage cabinet, comprising a cabinet housing which demarcates a storage space inside the cabinet housing from an external environment of the storage cabinet, where the cabinet housing comprises an air lock which allows material transport between an inner transfer position located in the storage space and an outer transfer position located in the external environment, where in the storage space there is present a storage device for accommodating material at defined storage positions and where in the storage space there is present a manipulation device for material transport between the inner transfer position and the storage device, where the air lock includes an air lock aperture in a wall of the cabinet housing which penetrates through the wall, the air lock comprises a rotating body mounted rotatably relative to the cabinet housing about an axis of rotation, having at least one loading formation which is installed in the air lock aperture in such a way that the loading formation is displaceable about the axis of rotation between the inner transfer position and the outer transfer position through rotation of the rotating body, wherein one of the rotating body and the cabinet housing wall with air lock aperture includes a seal with a sealing surface which is configured for sealing abutment against the other of the rotating body and the cabinet housing wall, wherein the laboratory storage cabinet includes a sealing surface clamping device, by means of which the sealing surface of the seal of the one of the rotating body and the cabinet housing wall is clampable towards the respective other of the rotating body and the cabinet housing wall and unclampable in an opposite direction.

2. The laboratory storage cabinet according to claim 1, wherein the laboratory storage cabinet includes a rotary drive for rotating the rotating body.

3. The laboratory storage cabinet according to claim 1, wherein the laboratory storage cabinet includes a rotary drive for rotating the rotating body, the laboratory storage cabinet further includes a control device which is configured at least for controlling the rotary drive and the sealing surface clamping device, and wherein the control device is further configured to unclamp a clamped sealing surface before operation of the rotary drive and/or to clamp an unclamped sealing surface after operation of the rotary drive.

4. The laboratory storage cabinet according to claim 1, wherein the laboratory storage cabinet comprises at least one transfer sensor that detects a change in a loading situation of the loading formation in the outer transfer position, and/or comprises at least one engagement sensor that detects whether an object protrudes from outside the rotating body into a movement space of the rotating body.

5. The laboratory storage cabinet according to claim 1, wherein by means of the sealing surface clamping device the sealing surface is displaceable towards the respective other of the rotating body and the cabinet housing wall and away from the cabinet housing wall.

6. The laboratory storage cabinet according to claim 5, wherein only the sealing surface of the seal of one of the rotating body and the cabinet housing wall with the air lock aperture is clampable by the sealing surface clamping device towards the other of the rotating body and the cabinet housing wall and unclampable in an opposite direction, whereas a sealing counterface of a seal of the other of the rotating body and the cabinet housing wall which is in sealing abutment engagement with the clampable and unclampable sealing surface of the first component is deformable by a clampable sealing surface.

7. The laboratory storage cabinet according to claim 1, wherein the sealing surface clamping device is configured to introduce gas into a seal interior space of the seal and/or comprises a pinching device which is configured to deform the seal in a first direction thereby displacing the sealing surface in a second direction which differs from the first direction.

8. The laboratory storage cabinet according to claim 7, wherein the laboratory storage cabinet includes a frame which surrounds the air lock aperture and the rotating body, where the pinching device comprises two frame components of the frame having a gap between the two frame components in which gap the seal is positioned, wherein a pinch drive is provided for moving at least one of the two frame components nearer to another one of the two frame components, thereby decreasing the gap dimension between the two frame components.

9. The laboratory storage cabinet according to claim 1, wherein the rotating body includes at least two loading formations, of which one first loading formation is situated in one transfer position out of the outer transfer position and the inner transfer positions when a second loading formation different from the first loading formation is situated in the respective other transfer position.

10. The laboratory storage cabinet according to claim 9, wherein the first loading formation is physically separated from the second loading formation by a partition of the rotating body.

11. The laboratory storage cabinet according to claim 10, wherein in a region of the partition there is arranged a partition material configured separately from a rest of the rotating body, having a lower specific thermal conductivity and/or having a lower heat transfer coefficient than a material used predominantly to form the rotating body.

12. The laboratory storage cabinet according to claim 1, wherein only the sealing surface of the seal of one of the rotating body and the cabinet housing wall with the air lock aperture is clampable by the sealing surface clamping device towards the other of the rotating body and the cabinet housing wall and unclampable in an opposite direction, whereas a sealing counterface of a seal of the other of the rotating body and the cabinet housing wall which is in sealing abutment engagement with the clampable and unclampable sealing surface of the first component is deformable by a clampable sealing surface.

13. The laboratory storage cabinet according to claim 12, wherein the sealing surface clamping device is configured to introduce gas into a seal interior space of the seal and/or comprises a pinching device which is configured to deform the seal in a first direction thereby displacing the sealing surface in a second direction which differs from the first direction.

14. The laboratory storage cabinet according to claim 13, wherein the laboratory storage cabinet includes a frame which surrounds the air lock aperture and the rotating body, where the pinching device comprises two frame components of the frame having a gap between the two frame components in which gap the seal is positioned, wherein a pinch drive is provided for moving at least one of the two frame components nearer to another one of the two frame components thereby, decreasing the gap dimension between the two frame components.

15. A laboratory storage cabinet, comprising a cabinet housing which demarcates a storage space inside the cabinet housing from an external environment of the storage cabinet, where the cabinet housing comprises an air lock which allows material transport between an inner transfer position located in the storage space and an outer transfer position located in the external environment, where in the storage space there is present a storage device for accommodating material at defined storage positions and wherein in the storage space there is present a manipulation device for material transport between the inner transfer position and the storage device, wherein the air lock includes an air lock aperture in a wall of the cabinet housing which penetrates through the wall, the air lock comprises a rotating body mounted rotatably relative to the cabinet housing about an axis of rotation, having at least one loading formation which is installed in the air lock aperture in such a way that the loading formation is displaceable about the axis of rotation between the inner transfer position and the outer transfer position through rotation of the rotating body, wherein a sealing surface clamping device is configured to introduce gas into a seal interior space of a hollow seal component and/or comprises a pinching device which is configured to deform the hollow seal in a first direction in order to displace thereby the sealing surface in a second direction which differs from the first direction, the laboratory storage cabinet includes a preassembled air lock assembly, comprising at least the rotating body and a frame surrounding the rotating body and the air lock aperture.

16. The laboratory storage cabinet according to claim 15, wherein the frame which surrounds the air lock aperture and the rotating body, wherein the pinching device comprises two frame components of the frame having a gap between the two frame components in which gap a seal is positioned, wherein a pinch drive is provided for moving at least one of the two frame components nearer to another one of the two components, thereby decreasing the gap dimension between the two frame components, wherein the preassembled air lock assembly includes the pinch drive and/or wherein the preassembled air lock assembly includes a rotary drive for rotating the rotating body.

* * * * *